(12) United States Patent
Marcial-Simon et al.

(10) Patent No.: US 11,130,421 B2
(45) Date of Patent: Sep. 28, 2021

(54) METHOD FOR CONTROLLING THE ELECTRICAL CHARGING OF A GROUP OF VEHICLES

(71) Applicant: Bayerische Motoren Werke Aktiengesellschaft, Munich (DE)

(72) Inventors: Enrique Marcial-Simon, Veitshoechheim (DE); Rainer Mehlhorn, Landsham (DE); Xaver Pfab, Herdweg (DE); Thomas Stauner, Unterschleissheim (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 300 days.

(21) Appl. No.: 16/365,779

(22) Filed: Mar. 27, 2019

(65) Prior Publication Data

US 2019/0217738 A1 Jul. 18, 2019

Related U.S. Application Data

(63) Continuation of application No. PCT/EP2017/061012, filed on May 9, 2017.

(30) Foreign Application Priority Data

Oct. 11, 2016 (DE) ...................... 10 2016 219 726.6

(51) Int. Cl.
*B60L 53/63* (2019.01)
*B60L 53/68* (2019.01)
(Continued)

(52) U.S. Cl.
CPC ............. *B60L 53/63* (2019.02); *B60L 53/305* (2019.02); *B60L 53/31* (2019.02); *B60L 53/53* (2019.02);
(Continued)

(58) Field of Classification Search
CPC .......... B60L 53/63; B60L 53/53; B60L 53/66; B60L 53/62; B60L 53/305; B60L 53/67;
(Continued)

(56) References Cited

U.S. PATENT DOCUMENTS 10,780,792 B2 * 9/2020 Marcial-Simon ....... B60L 53/68
2008/0281663 A1 * 11/2008 Hakim .................. B60L 53/665
705/7.25

(Continued)

FOREIGN PATENT DOCUMENTS

CN 102237684 A 11/2011
CN 102934319 A 2/2013
(Continued)

OTHER PUBLICATIONS

International Search Report (PCT/ISA/210) issued in PCT Application No. PCT/EP2017/061012 dated Sep. 1, 2017 with English translation (nine (9) pages).

(Continued)

*Primary Examiner* — Richard Isla
*Assistant Examiner* — Manuel Hernandez
(74) *Attorney, Agent, or Firm* — Crowell & Moring LLP

(57) ABSTRACT

The electrical charging of a group of vehicles electrically connected to an electricity grid is controlled. A central control system responds to a received increase command by performing a power increase operation according to an increase scheme. The increase command stipulates an amount by which the power draw by the group of vehicles needs to be increased. The increase scheme is ascertained by the central control system based on the increase command and specifies a temporary increase in the charging power for the energy store of one or more vehicles of the group. If the charging operation for the energy store of at least one vehicle is altered by the user after reception of the increase (Continued)

command and before or during the power increase operation, the central control system checks whether the parameters of the altered charging operation does not decrease the amount of power according to the increase command.

10 Claims, 2 Drawing Sheets

(51) Int. Cl.
  *B60L 53/62*   (2019.01)
  *H02J 3/14*   (2006.01)
  *B60L 53/31*   (2019.01)
  *B60L 53/67*   (2019.01)
  *B60L 53/66*   (2019.01)
  *B60L 53/53*   (2019.01)
  *B60L 53/30*   (2019.01)
  *B60L 58/13*   (2019.01)
  *H02J 7/00*   (2006.01)

(52) U.S. Cl.
  CPC .............. *B60L 53/62* (2019.02); *B60L 53/66* (2019.02); *B60L 53/67* (2019.02); *B60L 53/68* (2019.02); *H02J 3/14* (2013.01); *B60L 58/13* (2019.02); *B60L 2240/80* (2013.01); *B60L 2250/12* (2013.01); *B60L 2250/14* (2013.01); *H02J 7/00032* (2020.01); *H02J 7/00034* (2020.01)

(58) Field of Classification Search
  CPC ...... B60L 53/31; B60L 53/68; B60L 2240/80; B60L 2250/12; B60L 2250/14; B60L 58/13; H02J 3/14; H02J 7/00032; H02J 7/00034
  USPC ........................................................ 320/109
  See application file for complete search history.

(56) References Cited

U.S. PATENT DOCUMENTS

| | | |
|---|---|---|
| 2011/0245987 A1 | 10/2011 | Pratt et al. |
| 2011/0264287 A1 | 10/2011 | Yasuda et al. |
| 2012/0019203 A1 | 1/2012 | Kressner |
| 2012/0109403 A1 | 5/2012 | Shelton et al. |
| 2012/0161692 A1* | 6/2012 | Kobayashi .............. B60L 58/13 |
| | | 320/101 |
| 2013/0076122 A1 | 3/2013 | Ohtomo |
| 2013/0184886 A1* | 7/2013 | Pollack ................... B60L 53/65 |
| | | 700/291 |
| 2013/0346308 A1* | 12/2013 | Naito ..................... G07F 15/005 |
| | | 705/41 |
| 2014/0006137 A1 | 1/2014 | Melen et al. |
| 2014/0184170 A1* | 7/2014 | Jeong ...................... B60L 53/64 |
| | | 320/137 |
| 2014/0354227 A1* | 12/2014 | Tyagi .................. B60L 11/1844 |
| | | 320/109 |
| 2014/0361745 A1 | 12/2014 | Nishita et al. |
| 2015/0306970 A1 | 10/2015 | Son |
| 2016/0039301 A1 | 2/2016 | Igarashi et al. |
| 2016/0280091 A1 | 9/2016 | Kato et al. |
| 2016/0364646 A1* | 12/2016 | Fischer .............. G06Q 10/0631 |

FOREIGN PATENT DOCUMENTS

| | | | |
|---|---|---|---|
| CN | 103023089 | A | 4/2013 |
| CN | 103298644 | A | 9/2013 |
| CN | 105075059 | A | 11/2015 |
| CN | 105244969 | A | 1/2016 |
| DE | 10 2009 043 380 | A1 | 4/2011 |
| DE | 10 2011 105 417 | A1 | 12/2012 |
| DE | 10 2011 109 422 | A1 | 2/2013 |
| DE | 11 2012 005 488 | T5 | 10/2014 |
| DE | 10 2014 206 381 | A1 | 10/2015 |
| DE | 11 2014 001 783 | T5 | 12/2015 |
| EP | 2 273 648 | A2 | 1/2011 |
| EP | 2 875 986 | A1 | 5/2015 |
| JP | 2014030334 | A * | 2/2014 |
| WO | WO 2010/120551 | A1 | 10/2010 |
| WO | WO 2011/009129 | A1 | 1/2011 |
| WO | WO 2012/004897 | A1 | 1/2012 |
| WO | WO 2013/088229 | A2 | 6/2013 |

OTHER PUBLICATIONS

German-language Written Opinion (PCT/ISA/237) issued in PCT Application No. PCT/EP2017/061012 dated Sep. 1, 2017 (eight (8) pages).

German-language Search Report issued in counterpart German Application No. 10 2016 219 726.6 dated Jul. 19, 2017 with partial English translation (17 pages).

Cover Page of EP 2 721 708 A2 published Apr. 23, 2014 (one (1) page).

English translation of Chinese Office Action issued in Chinese Application No. 201780047344.X dated Jul. 2, 2021 (10 pages).

\* cited by examiner

METHOD FOR CONTROLLING THE ELECTRICAL CHARGING OF A GROUP OF VEHICLES

CROSS REFERENCE TO RELATED APPLICATIONS

This application is a continuation of PCT International Application No. PCT/EP2017/061012, filed May 9, 2017, which claims priority under 35 U.S.C. § 119 from German Patent Application No. 10 2016 219 726.6, filed Oct. 11, 2016, the entire disclosures of which are herein expressly incorporated by reference.

BACKGROUND AND SUMMARY OF THE INVENTION

The invention relates to a method for controlling the electrical charging of a group of vehicles and to a corresponding control system.

The prior art discloses the practice of controlling the charging of the energy stores of a group or pool of electrically drivable vehicles by means of a control system such that requirements of the operator of the electricity grid used for charging in respect of power reduction are also taken into consideration. In this case, the control system performs a power reduction operation according to a reduction scheme specifying a reduction in the charging power of the charging operation for the energy stores of vehicles in the vehicle pool by means of temporary suspension of the charging operation. Without the initialization of a power reduction operation, parameters are prescribed that need to be observed for charging the energy stores of the individual motor vehicles. Vehicles participating in a power reduction operation can diverge from these parameters of the charging operation if need be.

Normally, at least some of the parameters of the charging operation for the energy store of a vehicle can be altered manually by an associated user using a user interface. Since the user of a vehicle sometimes does not want to diverge from these parameters, the prior art discloses that the user can block his vehicle from participating in a power reduction operation (what is known as opt-out). Furthermore, the case can arise in which, during or shortly before performance of a power reduction operation, the parameters of a vehicle participating in this operation are altered by the user. Conventionally, the consequence of this is that the relevant vehicle then no longer participates in the power reduction operation. However, this has the disadvantage that the disappearance of the vehicle means that the reduction scheme for the power reduction operation needs to be recalculated again, which requires computation resources in the central control system.

Usually, users of motor vehicles are rewarded for participating in applicable power reduction operations by means of a reward system. For example, users can be provided with monetary benefits in return. As already mentioned above, the vehicle of a user currently automatically drops out from participating in a power reduction operation if the user manually alters parameters of the charging operation when a power reduction operation is imminent or has already begun, however. The user therefore has no incentive to select manual alterations for parameters of the charging operation for his vehicle such that his vehicle continues to participate in the power reduction operation.

The mechanisms described above can also be used to take into consideration requirements of the operator of an electricity grid in respect of a power increase, e.g. if overcapacities arise in the electricity grid of the operator that need to be absorbed by charging energy stores in a vehicle pool. To date, however, requirements regarding a power increase have not been taken into consideration for controlling the charging of the energy stores in a vehicle pool.

It is an object of the invention to configure control of the electrical charging of a group of vehicles such that requirements for a power increase can also be efficiently taken into consideration.

This object is achieved by the method and the control system in accordance with embodiments of the invention.

The method according to the invention is used for controlling the electrical charging of a group of vehicles electrically connected to an electricity grid of an electricity grid operator, wherein the respective vehicles draw power from the electricity grid for the purpose of charging a vehicle-based energy store for driving the respective vehicle. In other words, the vehicles are electrically drivable vehicles, such as e.g. pure electric vehicles or hybrid vehicles. In the method according to the invention, one or more parameters to be observed for the charging operation for the vehicle-based energy store of the respective vehicles are stipulated in advance. In this instance, a user of a respective vehicle can use a respective user interface to alter at least some of these parameters. Preferred embodiments of said parameters are described later on. Inter alia, the parameters can specify e.g. a desired departure time of the vehicle or a time window in which charging of the applicable vehicle is supposed to take place.

In the method according to the invention, a central control system can communicate with the respective vehicles in the group and with a server of the electricity grid operator. A central control system is intended to be understood in this instance to mean a control system or a control device controlling the charging of all vehicles in the group. This control system is realized in particular by means of software on an applicable server. The parameters to be observed and an alteration to these parameters are known to the central control system in this instance. For example, they are transmitted to the central control system via a wireless communication interface linked to the above user interface.

In the method according to the invention, the central control system responds to a received increase command by performing a power increase operation according to an increase scheme. In this instance, the increase command comes from the server of the electricity grid operator and stipulates an amount of power by which the power draw by the group of vehicles from the electricity grid needs to be increased. The increase scheme is ascertained or calculated by the central control system on the basis of the amount of power in the increase command. This ascertained or calculated increase scheme specifies a temporary increase in the charging power (scheduled or forecast without an increase scheme) of the charging operation for the energy store of one or more vehicles in a number of prescribed vehicles in the group, which means that the increase in the power draw by the group of vehicles by the amount of power according to the receiving increase command is achieved. The vehicles in the number of prescribed vehicles just defined are such vehicles from the group as have been selected to participate in the power increase operation and for which a divergence (caused by the control system) from the previously stipulated parameter(s) of the charging operation for the respective prescribed vehicles is permitted in the power increase operation according to the ascertained increase scheme, specifically regardless of whether there is actually a divergence from the parameters and whether a temporary increase in the charging power is actually stipulated for the respective prescribed vehicle. The power increase operation requires a temporary increase in the charging power to be specified just for at least one of the prescribed vehicles. The selection of the vehicles participating in the power increase operation is preferably made by the central control system. In this instance, only such vehicles as for which the divergence from the previously stipulated parameter(s) of the charging operation is actually permitted can be selected to participate in the power increase operation. If need be, all vehicles in the group for which a parameter divergence is permitted can also automatically participate in the power increase operation. Normally, ascertainment of an increase scheme involves computation rules being used that keep a divergence in the parameters and hence the effects for the user as small as possible.

In the event of the charging operation for the energy store of at least one prescribed vehicle being altered by the user by means of a change to at least one of its parameters after reception of the above increase command and before or during the power increase operation based thereon, the method according to the invention involves the central control system checking whether a prescribed criterion is satisfied. In this instance, the prescribed criterion is stipulated such that it is satisfied if the observance of the parameter(s) of the altered charging operation does not decrease the amount of power according to the increase command. Unless indicated otherwise, here and below, the at least one prescribed vehicle is intended to be understood to mean a vehicle in which parameters of the charging operation are altered before or during the power increase operation.

According to the invention, the central control system therefore checks whether the observance of a parameter alteration specified by the user has negative effects on the power increase operation in the sense that the desired power increase according to the amount of power in a received increase command is no longer achieved continuously.

If the above prescribed criterion is satisfied, i.e. if the observance of the parameters for the at least one prescribed vehicle has no negative effects on the power increase operation, the central control system begins or continues the power increase operation according to the increase scheme while the at least one prescribed vehicle participates in the power increase operation and while the parameter(s) of the altered charging operation is/are observed. If, by contrast, the prescribed criterion is not satisfied, the central control system ascertains a new increase scheme on the basis of the amount of power in the received increase command without the participation of the at least one prescribed vehicle, after which the central control system begins the power increase operation according to the new increase scheme.

The method according to the invention has the advantage that in the event of manual parameter alterations for charging operations an already calculated increase scheme can be maintained provided that the altered parameters have no negative effects on the power increase operation such that the desired power increase cannot be achieved continuously when these parameters are observed. Alteration of parameters therefore does not necessarily lead to calculation of a new increase scheme, as a result of which computation resources are saved in the central control system. Furthermore, in combination with a reward system in which a user is rewarded for participating in a power increase operation, user behavior can be influenced positively, since users have an incentive to ensure that when manually altering parameters of the charging operation for their vehicle the parameter alteration does not lead to the vehicle no longer participating in the power increase operation.

Depending on the configuration of the method according to the invention, the parameters of a charging operation for the energy store of a respective vehicle that are alterable by a user can comprise one or more of the following parameters:

a time window in which the energy store of the respective vehicle needs to be charged, for example a time window in which power costs are low, charging outside the time window also not being precluded;

a power value with which the energy store of the respective vehicle needs to be charged, and/or a maximum power value with which the energy store of the respective vehicle is supposed to be charged at maximum;

a departure time of the respective vehicle, a prescribed desired state of charge of the energy store of the respective vehicle needing to be reached at the departure time;

information about pre-conditioning that stipulates an amount of electric power needed by the respective vehicle before a departure time is reached, e.g. an amount of power for a heater or an air-conditioning system that needs to be activated before the departure time;

information according to which the charging of the energy store of the respective vehicle is supposed to be begun immediately when the vehicle is connected to the electricity grid and is supposed to be continued until a desired state of charge is reached;

a desired state of charge that needs to be reached by a departure time of the respective vehicle or to which the respective vehicle charges at maximum without specification of a departure time.

In a further embodiment of the method according to the invention, in the event of the prescribed criterion being satisfied, the control system further ensures that the power increase operation according to the increase scheme is no longer (automatically) manipulated by the central control system such that the altered charging operation is altered again while the at least one prescribed vehicle is participating in the power increase operation and while the parameter(s) of the altered charging operation is/are observed. The effect achieved by this variant of the invention is that the requirement of the user in respect of parameter alteration is always observed.

In a further preferred embodiment of the method according to the invention, during the check to determine whether the prescribed criterion is satisfied, the central control system takes into consideration a buffer that assumes a charging efficiency for the energy store of the at least one prescribed vehicle that is decreased in comparison with an expected charging efficiency, in order to prevent the increase in the power draw by the group of vehicles according to the increase scheme from being smaller than the amount of power according to the received increase command while the at least one prescribed vehicle is participating in the power increase operation and while the parameter(s) of the altered charging operation is/are observed. In this manner, any fluctuations during charging are taken into consideration such that the condition of a power increase by the amount of power in the increase command is met even if these fluctuations occur.

In a preferred variant, whenever an increase scheme is ascertained, the central control system takes into consideration a buffer that assumes a charging efficiency for the energy store of the respective prescribed vehicles that is decreased in comparison with an expected charging efficiency, in order to prevent the increase in the power draw by the group of vehicles according to the increase scheme from being smaller than the amount of power according to the received increase command.

In a further embodiment of the method according to the invention, the electricity grid has a stationary energy storage system connected to it. This stationary energy storage system is preferably a stationary battery store and is actuated by the central control system such that in the event of the increase in the power draw by the group of vehicles by the amount of power according to the increase command not being able to be achieved exclusively by means of temporary increase in the charging power for the energy store of prescribed vehicles in the group, the power draw by the stationary energy storage system from the electricity grid is increased or the power delivery by the stationary energy storage system to the electricity grid is decreased, so that the increase in the power draw by the group of vehicles that is achieved by temporary increase in the charging power of the charging operation for the energy store of prescribed vehicles in the group plus the amount of the increase in the power draw or of the amount of the decrease in the power delivery by the stationary energy storage system is consistent with the amount of power according to the increase command. This variant of the invention compensates for an inadequate power increase for vehicle-based energy stores by means of a stationary energy storage system.

In a further variant of the method according to the invention, a respective user interface by means of which a user of a respective vehicle can alter at least some of the parameters of the charging operation is part of a mobile (i.e. portable) device, such as e.g. a cellphone, a tablet or a laptop. Similarly, the user interface can be integrated in the respective vehicle. In this manner, the user can flexibly adapt his preferences regarding charging of the vehicle-based energy store at any locations or in the vehicle.

Besides the method described above, the invention relates to a central control system for controlling the electrical charging of a group of vehicles electrically connected to an electricity grid of an electricity grid operator, wherein the respective vehicles draw power for the purpose of charging a vehicle-based energy store for driving the respective vehicle. In this instance, one or more parameters to be observed for the charging operation for the energy store of the respective vehicles are stipulated and the user of the respective vehicle is able to use a respective user interface to alter at least some of these parameters. The central control system can communicate with the respective vehicles and with a server of the electricity grid operator. The central control system is configured such that it can perform the method according to the invention or one or more preferred variants of the method according to the invention.

Other objects, advantages and novel features of the present invention will become apparent from the following detailed description of one or more preferred embodiments when considered in conjunction with the accompanying drawings.

DETAILED DESCRIPTION OF THE DRAWINGS

Figure 1:
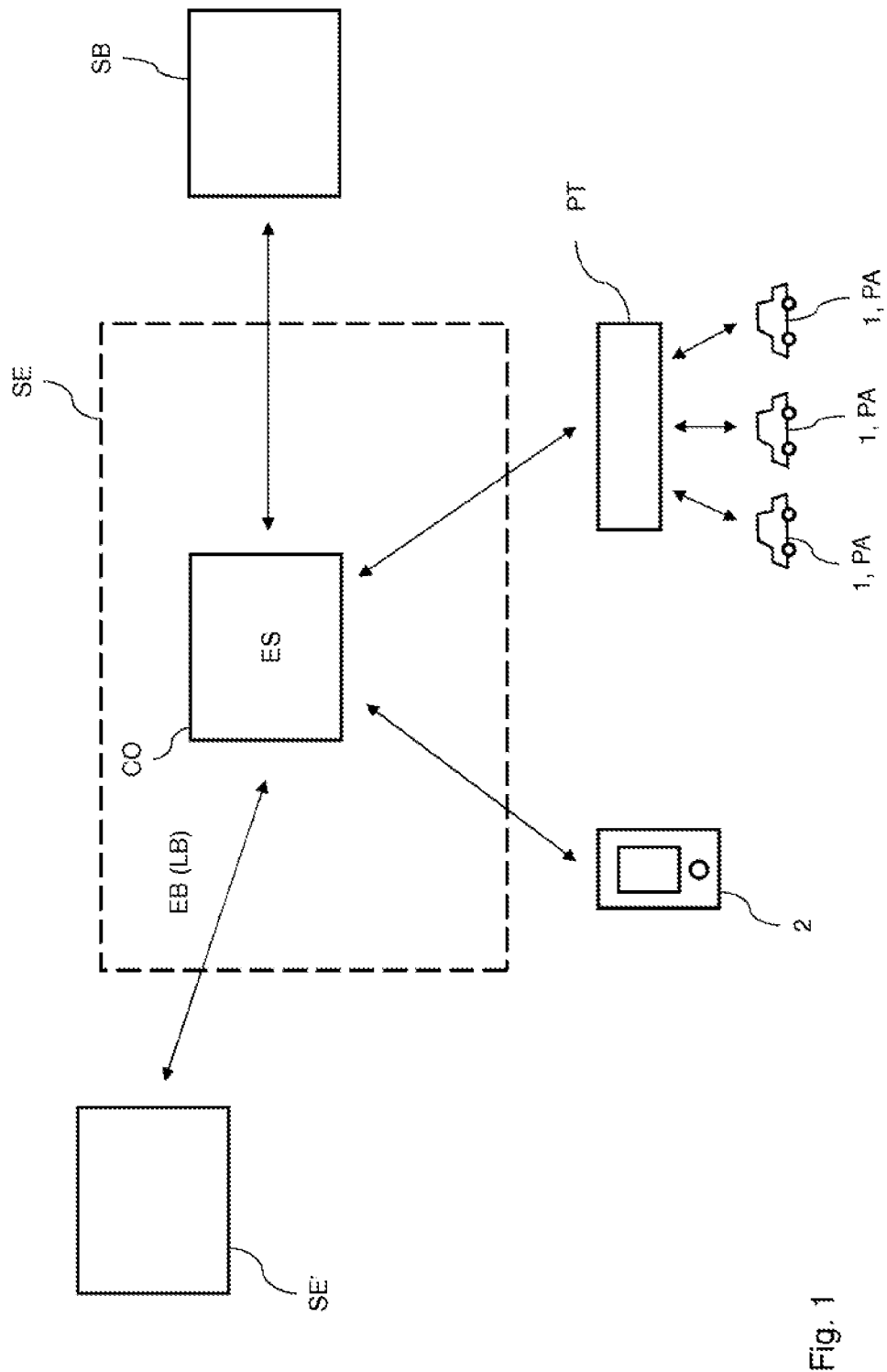
FIG. 1 is a schematic depiction of an infrastructure in which an embodiment of the method according to the invention is performed.

FIG. 1 presents a schematic depiction of an infrastructure for performing the method according to the invention. A core component of this infrastructure is a central control unit CO that is integrated in a server SE and is used for controlling the charging of a fleet comprising multiple electrically different vehicles (i.e. the drive batteries of these vehicles). If need be, the central control unit can also consist of multiple servers/modules/entities operating in parallel that are at different locations, in order to avoid what is known as a "single point of failure". By way of example, three electric vehicles 1 from this vehicle fleet are shown. These vehicles are communicatively linked to the control unit CO via a portal PT. Further, the vehicles 1 are linked to an electricity grid (not shown) in order to charge their drive batteries via the latter. The control system CO has access to the portal PT via a suitable control backend (not shown), said portal in turn being able to communicate with the individual vehicles 1, e.g. via SMS. The communication path via the portal PT can be used by the control unit CO to transmit to the individual vehicles 1 commands for temporarily increasing the charging power of their charging operation on the basis of the increase scheme ES described later on.

The individual vehicles 1 each store parameters, which are referred to generally by the reference sign PA. The parameters relate to the charging operations to be performed in the individual vehicles and need to be observed as far as possible when the vehicles are being charged. The parameters PA are also available to the control system CO. For example, the parameters may have been transferred to the control system CO via the portal PT.

Each individual vehicle 1 has an associated user who has a smartphone 2, only a single smartphone being indicated for reasons of clarity. This smartphone can be used by the user to communicate firstly with the control system CO via the control backend, not shown, and secondly with his vehicle via the portal PT. In particular, the user can alter the parameters PA of the charging operation for his vehicle on the smartphone, this information being forwarded firstly to the control system CO and secondly to the respective vehicle.

In the variant of the invention that is described here, the user can stipulate, as parameters PA, inter alia, the future departure time at which the vehicle needs to be put into operation and what the desired state of charge of the drive battery needs to be at this departure time. If need be, the user can also specify what is known as "Immediate Charge", which involves the vehicle needing to be charged to a predetermined desired state of charge without interruption directly after connection to the electricity grid, in which case no departure time needs to be specified. If need be, the user can also stipulate what is known as preconditioning as a parameter. This preconditioning involves specification of an amount of electric power needed by the vehicle before the departure time is reached. The amount of power is needed e.g. for the heater or the air-conditioning system of the motor vehicle, which needs to be activated before the actual departure time.

According to FIG. 1, the control system CO also communicates with a server SE' belonging to an electricity grid operator whose electricity grid is used to charge the vehicles 1 of the vehicle fleet or the batteries thereof. Furthermore, the infrastructure of FIG. 1 has provision for an energy storage system in the form of a stationary battery store SB that is actuatable via the control system CO by means of a suitable interface and belongs to the operator of the control system CO. The operator of the control system is e.g. the manufacturer of the vehicles 1 of the vehicle fleet.

One aim of the infrastructure in FIG. 1 is for the electricity grid operator to be able to use its server SE' to send increase commands EB to the control system CO in the event of overcapacities in its electricity grid, whereupon the control system increases the charging power for at least some of the currently charging vehicles 1 for a prescribed period of time in a suitable manner so as thereby to absorb the overcapacities in the electricity grid. The period of time for the power increase is firmly prescribed in the embodiment described here and is one hour.

The increase command EB transmitted to the control system CO by the server SE' contains a stipulated amount of power LB by which the power delivery from the electricity grid to the charging vehicles 1 can be increased by means of the control system CO. On the basis of this amount of power LB, the control system CO ascertains an increase scheme ES indicating for which vehicles from a set of prescribed vehicles in the vehicle fleet the charging power needs to be temporarily increased. Subsequently, the power increase operation is performed by the control unit CO according to the increase scheme. The prescribed vehicles just mentioned have in this instance been selected to participate in the power increase operation by the control system CO. The prescribed vehicles in this instance meet the condition that parameters PA specified by the user do not have to be observed by the control system for the power increase operation, specifically regardless of whether there is actually a divergence from the parameters and whether the charging power is actually increased for the applicable prescribed vehicle. The power increase operation involves applicable commands for adapting the charging power being sent to those prescribed vehicles whose charging power is actually increased. In this context, a power increase operation is performed by means of the control system CO on the basis of the increase scheme ES.

As just mentioned, this power increase operation can involve a divergence from the parameters PA that are actually to be observed for the charging operations if need be, which means that sometimes preferences of the respective user of the vehicle are intermittently not borne in mind. This can be disadvantageous for the individual user. Therefore, the user can e.g. use his smartphone 2 to specify that he does not wish to participate in power increase operations (opt-out). However, to get the user to have his vehicle participate in power increase operations despite possible disadvantages, a suitable reward system is used, according to which the user is provided with monetary compensation if he participates in power increase operations.

The situation can now arise in which the parameters PA of the charging operation for a vehicle participating in an imminent power increase operation are altered by the user in the short term. To take account of this alteration, this vehicle is conventionally no longer included in the imminent power increase operation, but the altered number of vehicles means that this leads to a new increase scheme having to be calculated by the control system CO. Furthermore, a user who alters applicable parameters in the short term has no incentive at all to shape this parameter alteration such that it is still possible for his vehicle to participate in the imminent power increase operation despite altered parameters. This is the case when the power increase by the amount of power LB can continue to be achieved with the imminent power increase operation despite altered parameters.

According to the invention, an alteration of parameters of the charging operation for a vehicle by a user does now not automatically entail non-participation in the applicable power increase operation. Rather, the control system CO first of all checks whether the power increase operation according to the increase scheme ES can be performed without alteration while the altered parameters are observed, in order to achieve the desired power increase by the amount of power LB in the increase command EB. In other words, the control system checks whether the observation of the parameters of the altered charging operation decreases the amount of power LB. Should there be no such decrease, the applicable vehicle having the altered parameters continues to remain involved in the power increase operation, and the power increase operation is performed according to the increase scheme ES. If, by contrast, the amount of power LB is decreased, the control system CO calculates a new increase scheme, specifically without the participation of the vehicle having the altered parameters. In this manner, it is always ensured that an increase in the power drawn from the electricity grid by the amount of power in the increase command is achieved. At the same time, however, the requirements of the users regarding an alteration of the parameters of a charging operation are also taken into consideration in suitable fashion.

Figure 2:
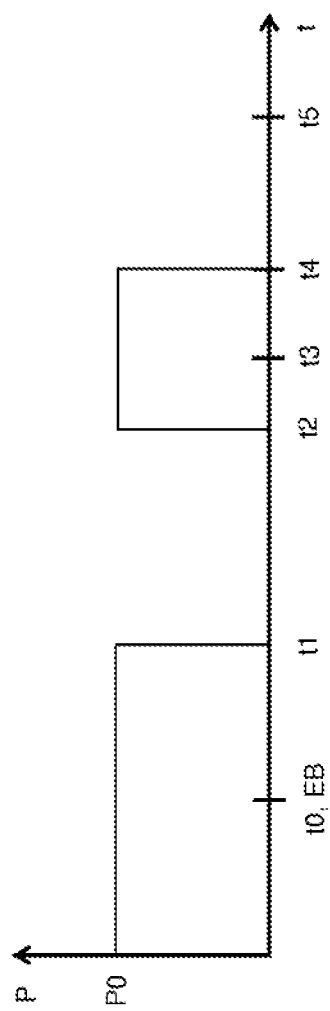
FIG. 2 is a graph showing, by way of example, a scenario in which the method according to the invention is used.

FIG. 2 shows a scenario in which the method according to the invention is used. This figure shows a graph in which time t is indicated along the abscissa and the power draw P by an energy store of a vehicle from FIG. 1 for which parameters of its charging operation are altered by a user is indicated along the ordinate.

In the scenario in FIG. 2, the vehicle is in the "Immediate Charge" state when connected to the electricity grid. Accordingly, the vehicle needs to be charged with the power value P0 until a prescribed desired state of charge of its drive battery is reached. Furthermore, the user of the vehicle has stipulated a departure time as the time t5. On the basis of the present state of charge of the battery, the desired state of charge is reached at a time shortly before the time t2. At the time t0, an increase command EB is received in the control system CO from the server SE of the electricity grid operator. According to this increase command, the power drawn by the drive batteries of the vehicle fleet can be increased in the period between the times t2 and t3 on account of an overcapacity in the electricity grid.

To achieve the power increase according to the increase command EB, the control system CO diverges from the "Immediate Charge" parameter of the vehicle under consideration. Instead, a charging time window with charging beginning at the time t2 and charging ending at the time t4 is stipulated. This charging time window covers the period between the times t2 and t3 in which an increased power can be provided. Furthermore, the control system CO stipulates a charging pause for the drive battery of the vehicle under consideration between the times t1 and t2. This charging pause is required, since otherwise the desired state of charge of the vehicle would be reached before the time t2 and hence a power draw by the drive battery would not be possible in the period between t2 and t4.

At a time between t0 and t3, the user of the vehicle now changes the departure time by stipulating a later departure time, but leaves the charging time window between the times t2 and t4 unaltered. This information is evaluated by the control system CO, which then establishes that this altered departure time does not lead to the period in which the power can be increased (i.e. the period between t2 and t3) being shortened. This would be the case if the departure time were to be moved to a time before t3. Accordingly, the vehicle continues to be a participant in the power increase operation and a new increase scheme is not calculated.

In another case, the user alters the charging time window at a time between t0 and t3 such that the time t4 is moved forward, but is after the time t3. This case also does not lead to a shortening of the period in which an increased power can be provided. Therefore, in this case too, participation by the vehicle in the power increase operation is not terminated and the calculated increase scheme continues to be used.

A further scenario in which the method according to the invention is used is explained below. In this case, it is again assumed that the user has selected the "Immediate Charge" state in the vehicle under consideration. Finally, a power increase command EB is received in the central control system CO. In this instance, the control system establishes that the vehicle will, on the basis of its present state of charge, certainly or very probably charge for longer than the period stipulated in the increase command EB as the period of time for providing increased power. Accordingly, the vehicle under consideration is selected to participate in the power increase operation by the central control system. At the same time, the "Immediate Charge" parameter is not altered, since it can be assumed that power is also actually received by the vehicle in the period of the power increase.

The case now arises in which the vehicle user alters the set parameters to the effect that instead of the "Immediate Charge" state a charging time window is obtained in which the vehicle needs to be charged. In this instance, he selects this charging time window such that it also covers the period in which a power increase according to the increase command needs to occur. Accordingly, the parameter alteration also ensures that the applicable vehicle receives power for charging its drive battery in the period of the power increase. The vehicle therefore continues to participate in the power increase operation, and a new increase scheme is not calculated.

The stationary battery store SB shown in FIG. 1 is used in the embodiment described here only if the power increase specified by the command from the server SE' cannot be covered by the batteries of the vehicles in the vehicle pool. In this case, an increased power draw by the battery store from the electricity grid or a decreased power delivery by the battery store to the electricity grid is achieved, which means that the desired increase in the power is obtained in the electricity grid.

The embodiments of the invention that are described above have a series of advantages. In particular, depending on the context, the control system automatically ascertains whether a vehicle having altered parameters for its charging operation continues to participate in the applicable power increase operation. This is a context-dependent opt out, which does not explicitly have to be performed by a user. When the reward system in which a user is rewarded for participation in a power increase operation is used, this method allows stimulation of the user to the effect that he alters parameters manually such that he continues to participate in a power increase operation. Conventionally, any manual alteration of the parameters results in the user being excluded from participating in the power increase operation. The method according to the invention further ensures that manually altered parameters are observed, and hence the user requirement is met, even in the event of further participation by the vehicle in the power increase operation.

LIST OF REFERENCE SIGNS

1 Vehicles
2 Smartphone
CO Central control system
SE, SE' Server
SB Stationary battery store
PT Portal
EB Increase command
LB Amount of power
ES Increase scheme
t Time of day
t1, t2, . . . t5 Times
P Power
P0 Power value The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A method for controlling electrical charging of a group of vehicles electrically connected to an electricity grid of an electricity grid operator, wherein
the respective vehicles draw power from the electricity grid for charging a vehicle based energy store for driving the respective vehicle, one or more parameters to be observed for the charging operation for the energy store of the respective vehicles being stipulated and a user of a respective vehicle being able to use a respective user interface to alter at least some of these parameters, wherein
a central control system is communicatable with the respective vehicles in the group and with a server of the electricity grid operator, wherein
the central control system responds to a received increase command by performing a power increase operation according to an increase scheme, wherein
the increase command comes from the server of the electricity grid operator and stipulates an amount of power by which the power draw by the group of vehicles from the electricity grid needs to be increased, and wherein
the increase scheme is ascertained by the central control system on the basis of the amount of power in the increase command and specifies a temporary increase in the charging power of the charging operation for the energy store of one or more vehicles in a number of prescribed vehicles in the group such that the increase in the power draw by the group of vehicles by the amount of power according to the received increase command is achieved, the vehicles in the number of prescribed vehicles having been selected to participate in the power increase operation and a divergence from the one or more parameters of the charging operation for the respective prescribed vehicles being permitted for the number of prescribed vehicles in the power increase operation according to the ascertained increase scheme;
in an event of the charging operation for the energy store of at least one prescribed vehicle being altered by the user by way of a change to at least one of its parameters after reception of the increase command and before or during the power increase operation, the central control system checks whether a prescribed criterion is satisfied, the prescribed criterion being satisfied if observance of the one or more parameters of the altered charging operation does not decrease
the amount of power according to the increase
command;
in an event of the prescribed criterion being satisfied, the central control system begins or continues the power increase operation according to the increase scheme while the at least one prescribed vehicle participates in the power increase operation and while the one or more parameters of the altered charging operation are observed, and otherwise the central control system ascertains a new increase scheme on the basis of the amount of power in the increase command without the participation of the at least one prescribed vehicle, after which the central control system begins the power increase operation according to the new increase scheme, and
during the check to determine whether the prescribed criterion is satisfied, the central control system takes into consideration a buffer that assumes a charging efficiency for the energy storage of the at least one prescribed vehicle that is decreased in comparison with an expected charging efficiency, in order to prevent the increase in the power draw by the group of vehicles according to the increase scheme from being smaller than the amount of power according to the received increase command while the at least one prescribed vehicle is participating in the power increase operation and while the one or more parameters of the altered charging operation are observed.

2. The method as claimed in claim 1, wherein
the one or more parameters of the charging operation for the energy store of a respective vehicle that are alterable by a user comprise one or more of the following parameters:
a time window in which the energy store of the respective vehicle needs to be charged;
a power value with which the energy store of the respective vehicle needs to be charged, and/or a maximum power value with which the energy store of the respective vehicle is supposed to be charged at maximum;
a departure time of the respective vehicle, a prescribed desired state of charge of the energy store of the respective vehicle needing to be reached at the departure time;
information about pre conditioning that stipulates an amount of electric power needed by the respective vehicle before a departure time is reached;
information according to which the charging of the energy store of the respective vehicle is supposed to be begun immediately when the vehicle is connected to the electricity grid and is supposed to be continued until a desired state of charge is reached; and
a desired state of charge that needs to be reached by a departure time of the respective vehicle or to which the respective vehicle charges at maximum without specification of a departure time.

3. The method as claimed in claim 1, wherein
in the event of the prescribed criterion being satisfied, it is further ensured that the power increase operation according to the increase scheme is no longer manipulated by the central control system such that the altered charging operation is altered again while the at least one prescribed vehicle is participating in the power increase operation and while the one or more parameters of the altered charging operation are observed.

4. The method as claimed in claim 1, wherein
the electricity grid has a connected stationary energy storage system that is controlled by the central control system such that in the event of the increase in the power draw by the group of vehicles by the amount of power according to the increase command not being able to be achieved exclusively by way of temporary increase in the charging power of the charging operation for the energy store of prescribed vehicles in the group, the power draw by the stationary energy storage system from the electricity grid is increased or the power delivery by the stationary energy storage system to the electricity grid is decreased, so that the increase in the power draw by the group of vehicles that is achieved by temporary increase in the charging power of the charging operation for the energy store of prescribed vehicles in the group plus the amount of the increase in the power draw or of the decrease in the power delivery by the stationary energy storage system is consistent with the amount of power according to the increase command.

5. The method as claimed in claim 1, wherein
a respective user interface by which a user of a respective vehicle alters at some of the one or more parameters of the charging operation is part of a mobile device or is integrated in the respective vehicle.

6. A central control system for controlling electrical charging of a group of vehicles electrically connected to an electricity grid of an electricity grid operator, wherein
the respective vehicles draw power for charging a vehicle based energy store for driving the respective vehicle, one or more parameters to be observed for the charging operation for the energy store of the respective vehicles being stipulated and a user of a respective vehicle being able to use a respective user interface to alter at least some of these parameters, wherein
the central control system is communicatable with the respective vehicles and with a server of the electricity grid operator, wherein
the central control system is configured such that:
the central control system responds to a received increase command by performing a power increase operation according to an increase scheme, wherein the increase command comes from the server of the electricity grid operator and stipulates an amount of power by which the power draw by the group of vehicles from the electricity grid needs to be increased, and wherein the increase scheme is ascertained by the central control system on the basis of the amount of power in the increase command and specifies a temporary increase in the charging power of the charging operation for the energy store of one or more vehicles in a number of prescribed vehicles in the group such that the increase in the power draw by the group of vehicles by the amount of power according to the received increase command is achieved, the vehicles in the number of prescribed vehicles having been selected to participate in the power increase operation and a divergence from the one or more parameters of the charging operation for the respective prescribed vehicles being permitted for the number of prescribed vehicles in the power increase operation according to the ascertained increase scheme;

in an event of the charging operation for the energy store of at least one prescribed vehicle being altered by the user by way of a change to at least one of its parameters after reception of the increase command and before or during the power increase operation, the central control system checks whether a prescribed criterion is satisfied, the prescribed criterion being satisfied if the observance of the one or more parameters of the altered charging operation does not decrease the amount of power according to the increase command;

in an event of the prescribed criterion being satisfied, the central control system begins or continues the power increase operation according to the increase scheme while the at least one prescribed vehicle participates in the power increase operation and while the one or more parameters of the altered charging operation for the at least one prescribed vehicle are observed, and otherwise the central control system ascertains a new increase scheme on the basis of the amount of power in the increase command without the participation of the at least one prescribed vehicle, and the central control system begins or continues the power increase operation according to the new increase scheme; and during the check to determine whether the prescribed criterion is satisfied, the central control system takes into consideration a buffer that assumes a charging efficiency for the energy store of the at last one prescribed vehicle that is decreased in comparison with an expected charging efficiency, in order to prevent the increase in the power draw by the group of vehicles according to the increase scheme from being smaller than the amount of power according to the received increase command while the at least one prescribed vehicle is participating in the power increase operation and while the one or more parameters of the altered charging operation are observed.

7. The control system as claimed in claim 6, wherein the one or more parameters of the charging operation for the energy store of a respective vehicle that are alterable by a user comprise one or more of the following parameters:

a time window in which the energy store of the respective vehicle needs to be charged;

a power value with which the energy store of the respective vehicle needs to be charged, and/or a maximum power value with which the energy store of the respective vehicle is supposed to be charged at maximum;

a departure time of the respective vehicle, a prescribed desired state of charge of the energy store of the respective vehicle needing to be reached at the departure time;

information about pre conditioning that stipulates an amount of electric power needed by the respective vehicle before a departure time is reached;

information according to which the charging of the energy store of the respective vehicle is supposed to be begun immediately when the vehicle is connected to the electricity grid and is supposed to be continued until a desired state of charge is reached; and a desired state of charge that needs to be reached by a departure time of the respective vehicle or to which the respective vehicle charges at maximum without specification of a departure time.

8. The control system as claimed in claim 6, wherein in the event of the prescribed criterion being satisfied, it is further ensured that the power increase operation according to the increase scheme is no longer manipulated by the central control system such that the altered charging operation is altered again while the at least one prescribed vehicle is participating in the power increase operation and while the one or more parameters of the altered charging operation are observed.

9. The control system as claimed in claim 6, wherein the electricity grid has a connected stationary energy storage system that is controlled by the central control system such that in the event of the increase in the power draw by the group of vehicles by the amount of power according to the increase command not being able to be achieved exclusively by way of temporary increase in the charging power of the charging operation for the energy store of prescribed vehicles in the group, the power draw by the stationary energy storage system from the electricity grid is increased or the power delivery by the stationary energy storage system to the electricity grid is decreased, so that the increase in the power draw by the group of vehicles that is achieved by temporary increase in the charging power of the charging operation for the energy store of prescribed vehicles in the group plus the amount of the increase in the power draw or of the decrease in the power delivery by the stationary energy storage system is consistent with the amount of power according to the increase command.

10. The control system as claimed in claim 6, wherein a respective user interface by which a user of a respective vehicle alters at some of the one or more parameters of the charging operation is part of a mobile device or is integrated in the respective vehicle.

\* \* \* \* \*